United States Patent [19]

Yasui et al.

[11] 4,178,186

[45] Dec. 11, 1979

[54] RESIN FOR COATINGS

[75] Inventors: Seimei Yasui, Ibaraki; Minoru Hino, Toyonaka, both of Japan

[73] Assignee: Sumitomo Chemical Company, Limited, Osaka, Japan

[21] Appl. No.: 655,530

[22] Filed: Feb. 5, 1976

[30] Foreign Application Priority Data

Feb. 7, 1975 [JP] Japan .................................. 50/16634

[51] Int. Cl.$^2$ ......................... C09D 11/02; C08F 8/46
[52] U.S. Cl. ....................................... 106/20; 106/30; 260/879; 526/15; 526/52.2; 526/52.5; 526/56
[58] Field of Search .................... 106/20, 28, 32, 285, 106/310, 30; 260/669 P, 666 DQ, 101, 102, 27 BB, 879, 29.7 H

[56] References Cited

U.S. PATENT DOCUMENTS

| | | | |
|---|---|---|---|
| 3,429,952 | 2/1969 | Nordsiek et al. | 260/879 X |
| 3,654,203 | 4/1972 | Daimer et al. | 260/29.7 H X |
| 3,778,418 | 12/1973 | Nakayama | 260/879 |
| 3,804,788 | 4/1974 | Funaoka | 260/101 |
| 3,856,759 | 12/1974 | Koishi | 106/32 |
| 3,884,712 | 5/1975 | Go | 106/285 |
| 3,971,746 | 7/1976 | Hirai et al. | 260/29.7 H X |
| 3,983,062 | 9/1976 | Baldwin et al. | 260/29.7 H |
| 4,051,198 | 9/1977 | Patzsche | 260/879 |

*Primary Examiner*—Theodore Morris
*Attorney, Agent, or Firm*—Birch, Stewart, Kolasch and Birch

[57] ABSTRACT

A resin for coatings, particularly useful as a medium for printing inks and paints, comprising a modified polymer produced by adding at least one $\alpha,\beta$-unsaturated dicarboxylic acid or anhydride thereof to at least one liquid conjugated diolefinic polymer having a number average molecular weight of 150 to 3,000, a viscosity of 2 to 5,000 cps at 30° C. and at least 50% of cis-1,4 structure and subjecting the resulting adduct to imidation or diamidation with at least one amine having 1 to 27 carbon atoms and whereby the total amine value of the resulting modified polymer being made not more than 3.

12 Claims, No Drawings

RESIN FOR COATINGS

BACKGROUND AND SUMMARY OF THE INVENTION

The present invention relates to a novel resin useful for coatings. More particularly, it relates to a resin for coatings, i.e. useful as a medium for printing inks, paints or the like, which contains a modified polymer produced by adding an α,β-unsaturated dicarboxylic acid or anhydride thereof to a liquid conjugated diolefinic polymer having at least 50% of cis-1,4 structure, wherein the carboxyl group or the carboxylic anhydride group of the resulting adduct is imidated or diamidated and thereby the total amine value of the modified polymer is made substantially not more than 3.

Generally, the printing inks useful as a coating composition comprises a pigment, a medium and an auxiliary, i.e. a regulator for giving the composition suitable workability, drying characteristics and usability.

The medium may be usually drying oils, natural resins, processing natural resins, synthetic resins, bituminous substances, waxes, celluloses, rubber derivatives, solvents and plasticizers. As the drying oils linseed oil is mainly used, but Chinese tung oil, perilla oil and soybean oil may also be used. The natural resins and the processing natural resins include rosins, hardened rosins, polymerized rosins, rosin esters, maleic resins and shellac. The synthetic resins include phenol resins, phenol resins modified with rosin, xylene resins, modified alkyd resins, polyamide resins, and coumaronindene resins. There may be used other mediums, such as chlorinated rubber, cyclized rubber, nitrocellulose and various solvents.

The auxiliary agent includes a drier for promoting the drying of the composition (e.g. lead naphthenate, cobalt naphthenate), or a drying inhibitor, or a perfume, a ultraviolet absorber, or the like.

Besides, paints are used as a coating composition. The paints comprise a pigment (as a colorant); a medium, such as drying oils (e.g. tung oil, linseed oil, or dehydrated castor oil), semi-drying oils (e.g. soybean oil, tall oil, or fish oil), natural resins (e.g. rosin, copal.dammar gum, or shellac) and synthetic resins (e.g. phenol resin, melamine resin, urea resin, coumaron resin, acrylic resin, polyester resin, polyvinyl chloride resin, or alkyd resin); an appropriate solvent and a metallic drier for promoting the drying of the composition.

However, the natural drying oils and the natrual semi-drying oils used for coating compositions, such as printing inks or paints, are variable with the weather or the harvest, and therefore, it is very difficult to supply constantly a large amount of the products having good qualities.

Accordingly, it has been desired to develop a synthetic oil having the same or more excellent qualities and properties than those of the natural drying oil or the natural semi-drying oil.

Owing to the recent development in the petrochemistry, butadiene or other materials are easily available. Besides, the present inventors have found a process for producing an improved liquid polymer from diolefins, such as butadiene or isoprene, and it has now been found that a modified polymer having excellent properties and being usable for coating composition instead of the conventional natural drying oils or natural semi-drying oils can be produced from the liquid polymer.

An object of the present invention is to provide an improved resin suitable for coating composition, such as printing inks or paints.

Another object of the invention is to provide a modified polymer having a total amine value of not more than 3, i.e. an adduct of a liquid conjugated diolefinic polymer having at least 50% of cis-1,4 structure with an α,β-unsaturated dicarboxylic acid or anhydride thereof wherein the carboxyl group or the carboxylic anhydride group is imidated or diamidated.

A further object of the invention is to provide a printing ink containing the modified polymer as set forth above.

A still further object of the invention is to provide a paint containing the modified polymer as set forth above.

These and other objects of the invention will be apparent from the description hereinafter.

The resin for coatings of the present invention contains a modified polymer having not more than 3 of a total amine value, which is produced by adding an α,β-unsaturated dicarboxylic acid or anhydride thereof to a liquid conjugated diolefinic polymer having a number average molecular weight of 150 to 3,000, a viscosity of 2 to 5,000 cps at 30° C. and not less than 50% of cis-1,4 structure and subjecting the resulting polymer adduct to imidation or diamidation.

The liquid polymer used in the present invention is characterized in that it has mainly cis-1,4 structure, which means that the present liquid polymer has an extremely lower viscosity in comparison with the conventional liquid polymer having predominantly vinyl structure. It is known that derivatives of a low molecular weight polybutadiene having predominantly vinyl structure are used for paints, but the derivatives have usually a high viscosity and therefore are limited in the use thereof. On the other hand, the liquid polymer having a wide range of molecular weight and having predominantly cis-1,4 structure of the present invention can be modified in the liquid state, and further, since it is liquid and has a low viscosity even after imidated or diamidated, it can be used to produce the desired ink or paint without using a diluent and can give a film having excellent toughness, plasticity and adhesion. Moreover, the liquid polybutadiene having predominantly cis-1,4 structure has the merit that in the event is used as a printing ink, it can be easily cured when applied in a film-thickness of 3 to 5 $\mu$.

The starting liquid conjugated diolefinic polymer used for the adduct in the present invention contains at least 50% of cis-1,4 structure and 0.5 to 10% of vinyl structure and the remaining percent of trans-1,4 structure (in case of polyisoprene, 3,4 structure being less than 30%) and has a number average molecular weight of 150 to 3,000 and a viscosity of 2 to 5,000 cps, preferably 2 to 2,000 cps at 30° C.

Suitable examples of the liquid conjugated diolefinic polymer are a liquid polybutadiene, a liquid polyisoprene, a liquid copolymer of different kinds of conjugated diolefins, a liquid copolymer of a conjugated diolefin with a small amount of a monoolefin or an aromatic vinyl compound, or the like. In case of copolymer of butadiene or isoprene with styrene, the liquid copolymer contains not more than 40% by weight of styrene. These liquid conjugated diolefinic polymers can be produced by the methods described in Japanese Patent Laid Open Publication (without examination)

Nos. 43,084/1973, 26,396/1974 and 89,788/1974, but any other method may be usable.

Other starting α,β-unsaturated dicarboxylic acid or anhydride thereof used for the adduct in the present invention may be maleic acid, maleic anhydride, fumaric acid, itaconic acid, citraconic acid, or the like. The preferred acid is maleic acid or maleic anhydride.

The adduct in the present invention can be produced by heating a mixture of at least one liquid conjugated diolefinic polymer and at least one α,β-unsaturated dicarboxylic acid or anhydride thereof at an atmosphere of an inert gas at a temperature of 150° to 250° C. for 1 to 10 hours without using any catalyst. In this reaction, the α,β-unsaturated dicarboxylic acid or anhydride thereof is quantitatively added to the liquid conjugated diolefinic polymer.

The adduct used in the present invention contains preferably 3 to 50% by weight, more preferably 10 to 40% by weight, of the α,β-unsaturated dicarboxylic acid or anhydride thereof. When the content of the α,β-unsaturated dicarboxylic acid or anhydride thereof is less than 3% by weight, the imidated or diamidated product derived from the adduct shows inferior properties, particularly insufficient compatibility with natural oils and fats or natural or synthetic resins and insufficient drying characteristics and film forming properties, and on the other hand, when the content is over 50% by weight, the product derived therefrom has too high viscosity and can not practically be used.

The imidation or diamidation of the adduct of the liquid conjugated diolefinic polymer with the α,β-unsaturated dicarboxylic acid or anhydride thereof can be carried out with amines having 1 to 27 carbon atoms. Suitable examples of the amines are methylamine, ethylamine, propylamine, butylamine, amylamine, hexylamine, octylamine, nonylamine, decylamine, undecylamine, dodecylamine, tridecylamine, tetradecylamine, pentadecylamine, hexadecylamine, heptadecylamine, octadecylamine, docosylamine, isopropylamine, isobutylamine, sec-butylamine, tert-butylamine, 2-aminopentane, 3-aminopentane, 1-amino-2-methylbutane, 2-amino-2-methylbutane, 3-amino-2-methylbutane, 4-amino-2-methylbutane, 1-amino-2,2-dimethylpropane, 5-amino-2-methylpentane, or other primary amine containing at least one substituent selected from hydroxy, halogen an an aromatic group in the alkyl group, or aniline, an alkyl substituted aniline, or the like, which may be used alone or in a mixture of two or more kinds thereof. Among these amines, preferred one is a primary amine having 2 to 18 carbon atoms.

The imidation reaction of the adduct with the amine can be carried out in the conventional manner, for instance, by reacting the adduct with a somewhat excess amount, preferably 20 to 50 molar percent excess amount, of the amine at a temperature of 50° to 250° C., preferably 100° to 200° C., for 30 minutes to 8 hours at an atmosphere of an inert gas, while the by-produced water is taken out from the reaction system. An appropriate solvent may be used in the reaction. The diamidation of the adduct with the primary amine can be carried out by ring-opening the carboxylic anhydride group in the adduct and thereafter treating the resultant in the same manner as in the imidation reaction.

According to the above imidation or diamidation of the carboxyl group or the carboxylic anhydride group in the adduct, the modified polymer shows not more than 3 of a total amine value. When the total amine value of the polymer is over 3, the product shows undesirably bad smell.

It is very important for obtaining the desired coating composition having excellent properties that the resin satisfies the above-mentioned conditions. That is, there are known some liquid conjugated diolefinic polymers, but they are not suitable for the coating composition of the present object because of the inferior dispersibility with pigments and the inferior compatibility with other various resins, natural drying oils or semi-drying oils. When the conventional liquid conjugated diolefinic polymers are used for the coating composition in the form of an adduct thereof with an α,β-unsaturated dicarboxylic acid or anhydride thereof, the dispersibility with pigments and the compatibility with other resins are improved, but on the contrary, the acid value thereof becomes more than 30, and as the result, the stability thereof with pigments is remarkably reduced to induce the phrase separation, and further, owing to the rapid increase of the viscosity thereof, they are hardly used as the medium for printing inks or paints. Besides, in order to decrease the viscosity, the adduct of the conventional liquid conjugated diolefinic polymer with an α,β-unsaturated dicarboxylic acid or anhydride thereof may be reacted with an alcohol to give a semi-esterified product, but the product is still not practically usable for coating compositions because it has still inferior stability with pigments owing to the high acid value thereof and further shows inferior water resistance.

The resin for coating of the present invention comprising the modified polymer, i.e. the adduct of the liquid conjugated diolefinic polymer with the α,β-unsaturated dicarboxylic acid or anhydride thereof wherein the carboxyl group or the carboxylic anhydride group is imidated or diamidated, is useful as a medium for printing inks and paints. When the resin of the present invention is used as one component of the printing inks or paints, it shows an excellent compatibility with the other various resinous components contained therein, and the resulting printing inks and paints show excellent characteristics. For instance, it is used for a printing ink for offset printing, the product shows an excellent adhesion onto the paper, particularly excellent drying characteristics, and therefore there can be obtained a good print having an excellent gloss. Moreover, the printing ink containing the resin of the present invention is remarkably excellent in the elimination of the dirts which occur in case of losing the balance between the dampening solution and the addition amount of the printing ink during the printing in comparison with the conventional printing ink containing the drying oil. Besides, the paint containing the resin of the present invention can give a glossy coating layer having excellent properties.

The printing ink of the present invention contains 3 to 50% by weight of the present resin and further an appropriate amount of the other components used in the conventional printing inks as mentioned hereinbefore, such as pigments, solvents, resins (e.g. natural resins, phenol resins, or xylene resins), driers, ultraviolet absorbents, or the like.

The paint of the present invention contains 5 to 80% by weight of the present resin and further an appropriate amount of the other components used in the conventional paints as mentioned hereinbefore, such as pigments, and optionally solvents, resins (e.g. phenol resins, alkyd resins), metallic driers, or the like.

The present invention is illustrated by the following Examples but is not limited thereto.

EXAMPLE 1

A 500 ml three-necked flask provided with a stirrer, a thermometer and a three-way cock for sealing an inert gas is charged with a liquid polybutadiene (viscosity: 102 cps at 30° C., number average molecular weight measured by a vapor pressure osmometer: 930, iodine value (Wijs method): 463, cis-1,4 structure: 56%, trans-1,4 structure: 33% and vinyl structure: 11%, 352 g) and maleic anhydride (48 g). After replacing the air in the flask with nitrogen gas, the mixture is reacted at 190° C. for 4 hours under the nitrogen pressure to give a maleic acid adduct of the liquid polybutadiene (Gardner's color standard: 5-6, viscosity: 980 cps at 25° C.).

The maleic acid adduct thus obtained (81.7 g) and oleylamine (26.8 g) are charged into a 300 ml four-necked flask provided with a stirrer, a thermometer, a condenser and a tube for blowing an inert gas. The mixture is heated at 150°-170° C. until the total amine value of the reaction mixture becomes not more than 1.0, while the by-produced water is taken out from the reaction system through the condenser. After the reaction, the reaction mixture is condensed under reduced pressure for removing the substances having a low boiling point, and thereby the desired imidated product is obtained.

The imidated product thus obtained shows the total amine value: 0.9, the iodine value (Wijs method): 314 and the viscosity: 590 cps at 25° C., and has an excellent compatibility with #5 solvent (made by Nippon Petrochemicals Co., Ltd., aniline point: about 73) in the wide range, which mixture is transparent.

The imidated product (100 parts by weight) is kneaded with titanium white (100 parts by weight), cobalt naphthenate (0.03 part by weight, based on the metal) and lead naphthenate (0.3 part by weight, based on the metal) to give a liquid composition.

The composition thus obtained is applied to a glass plate in a thickness of about 0.04 mm and allowed to stand at room temperature. After about 4 hours, it becomes tack free (i.e. when the coating layer is slightly pressed with finger, no fingerprint leaves), and a good glossy coating film is obtained.

For comparison purpose, linseed oil is used instead of the imidated product in the above test, the coating layer becomes tack free after 6 hours. From these results, it is clear that the composition of the present invention has more excellent drying characteristics in comparison with the conventional composition.

EXAMPLE 2

The imidated product obtained in Example 1 (60 parts by weight) is kneaded well with a phenol resin modified with rosin (40 parts by weight), titanium white (100 parts by weight), cobalt naphthenate (0.03 part by weight, based on the metal) and lead naphthenate (0.3 part by weight, based on the metal) to give a liquid composition. On the liquid composition, the drying characteristics are tested at room temperature in the same manner as described in Example 1. As the result, the coating layer becomes tack free at about 4 hours and is completely cured at about 8 hours to give a good, glossy coating film.

For comparison purpose, linseed oil is used instead of the imidated product in the above test, the coating layer becomes tack free after about 6 hours and is completely cured after 20 hours or more.

EXAMPLE 3

Into a 300 ml four-necked flask provided with a stirrer, a thermometer, a condenser and a tube for blowing an inert gas are charged the maleic acid adduct obtained in Example 1 (100 g) and n-hexylamine (30 g). The mixture is reacted at 120°-130° C. until the total amine value becomes not more than 1.0. After the reaction, the reaction mixture is treated in the same manner as described in Example 1 to give the desired imidated product of faint yellow. The imidated product thus obtained shows the total amine value: 0.7, the iodine value: 350 and the viscosity: 700 cps at 25° C., and has an excellent compatibility with #5 solvent (aniline point: about 73) in the wide range, which mixture is transparent.

The imidated product (100 parts by weight) is kneaded well with titanium white (100 parts by weight), cobalt naphthenate (0.03 part by weight, based on the metal) and lead naphthenate (0.3 part by weight, based on the metal) to give a liquid composition.

The composition thus obtained is applied to a glass plate in a thickness of about 0.04 mm and dried at room temperature. After about 4.5 hours, it becomes tack free and a good glossy coating film is obtained.

EXAMPLE 4

A 500 ml three-necked flask provided with a stirrer, a thermometer and a three-way cock for sealing an inert gas is charged with a liquid polybutadiene (viscosity: 102 cps at 30° C., number average molecular weight measured by a vapor pressure osmometer: 930, iodine value (Wijs method): 463, cis-1,4 structure: 56%, trans-1,4 structure: 33% and vinyl structure, 11%, 280 g) and maleic anhydride (120 g). After replacing the air in the flask with nitrogen gas, the mixture is reacted at 190° C. for 4 hours, under slight nitrogen pressure to give a maleic acid adduct of the liquid polybutadiene (Gardner's color standard: 5-6).

The maleic acid adduct thus obtained (100 g) and hexylamine (31 g) are charged into a 300 ml four-necked flask provided with a stirrer, a thermometer, a condenser and a tube for blowing an inert gas. The mixture is reacted at 120°-130° C. until the total amine value of the reaction mixture becomes not more than 1.0, while the by-produced water is taken out from the reaction system. After the reaction, the reaction mixture is condensed under reduced pressure for removing the substances having a low boiling point to give a faint brown imidated product. The imidated product thus obtained shows the total amine value: 0.9, the viscosity: 12,000 cps at 25° C. and Gardner's color standard: 7-8, and has an excellent compatibility with #5 solvent (aniline point: about 73) in the wide range, which mixture is transparent.

EXAMPLE 5

By using the imidated product obtained in Example 4, a resin varnish for printing ink is prepared according to the following formulation:

| | |
|---|---|
| (a) Phenol resin modified with resin (Hitanol ® 260, made by Hitachi Chemical Co., Ltd.) | 30 parts by weight |
| (b) Imidated product | 35 parts by weight |
| (c) #5 solvent (made by Nippon | |

| | |
|---|---|
| -continued | |
| Petrochemicals Co., Ltd.) | 30 parts by weight |

The components (a) and (b) are mixed and dissolved by heating at the cracking temperature of 250°+3° C. for 30 minutes. After cooling, to the mixture is added the component (c) to give the resin varnish (hereinafter, referred to as "Resin Varnish A").

A printing ink is prepared by a conventional method according to the following formulation:

| | |
|---|---|
| Carbon black (MA-50, made by Mitsubishi Chemical Industries, Ltd.) | 20 parts by weight |
| Resin Varnish A | 65 parts by weight |
| Alkali Blue Toner (made by Hoechst) | 3 parts by weight |
| #5 solvent | 12 parts by weight |

The printability of the printing ink thus obtained is tested under the following conditions:

| | |
|---|---|
| Printing press: | Lithographic, sheet feed, single color press |
| Printing speed: | 5,000 sheets/hour |
| Plate: | PS plate |
| Dampening solution: | pH 5.5 |
| Paper: | Art paper |
| Number of printing sheets: | 20,000 sheets |

As the result, the printing can be satisfactorily done and the printed material has good qualities.

EXAMPLE 6

In the same manner as described in Example 1, a maleic acid adduct of a liquid polybutadiene is produced from a liquid polybutadiene (viscosity: 42 cps at 30° C., number average molecular weight measured by a vapor pressure osmometer: 600, iodine value (Wijs method): 450, cis-1,4 structure: 62%, trans-1,4 structure: 29% and vinyl structure: 9%, 160 g) and maleic anhydride (40 g).

The maleic acid adduct thus obtained (98 g) is reacted with oleylamine (53.6 g) at 150°–160° C. at an atmosphere of an inert gas until the total amine value becomes not more than 1.5, while the by-produced water is taken out from the reaction system. The imidated product thus obtained has the total amine value: 1.0, the iodine value: 241 and the viscosity: 1,150 cps at 25° C., and has an excellent compatibility with #5 solvent (aniline point: about 73) in the wide range, which mixture is transparent.

The imidated product (100 parts by weight) is kneaded with titanium white (100 parts by weight), cobalt naphthenate (0.03 part by weight, based on the metal) and lead naphthenate (0.03 part by weight, based on the metal) to give a liquid composition. On this liquid composition, the drying characteristics are tested at room temperature in the same manner as described in Example 1. As the result, the coating layer becomes tack free at about $\alpha$ hours to give a good, glossy coating film.

EXAMPLE 7

In the same manner as described in Example 1, a maleic acid adduct of a liquid polybutadiene is produced from the same liquid polybutadiene used in Example 4 (140 g) and maleic anhydride (60 g).

The maleic acid adduct thus obtained (50 g) is reacted with n-hexylamine (17.0 g) at 125°–130° C. at an atmosphere of an inert gas, while the by-produced water is taken out from the reaction system. After the reaction, the reaction mixture is condensed under reduced pressure to remove the materials having a low boiling point. The imidated product thus obtained has the total amine value: 1.8 and the viscosity: 27,000 cps, and has an excellent compatibility with #5 solvent (aniline point: about 73), which mixture is transparent.

When the imidated product is cooked at 250° C. for 30 minutes with Hitanol ® 260S (phenol resin modified with rosin, made by Hitachi Chemical Co., Ltd.), Beckacite ® SK-235 (phenol resin modified with rosin, made by Dainippon Ink K.K.) or Hariester ® K (ester resin, made by Harima Kasei K.K.), they can give a homogeneous mixture.

What is claimed is:

1. A resin for coatings comprising a modified polymer consisting of an adduct of at least one liquid conjugated diolefinic polymer having a number average molecular weight of 150 to 3,000, a viscosity of 2 to 5,000 cps at 30° C., and at least 50% of cis-1,4 structure with at least one $\alpha,\beta$-unsaturated dicarboxylic acid or anhydride thereof, wherein the carboxyl group or the carboxylic anhydride group is imidated by reacting with at least one primary amine having 1 to 27 carbon atoms and thereby the total amine value of the resulting modified polymer is made not more than 3.

2. The resin according to claim 1, wherein the $\alpha,\beta$-unsaturated dicarboxylic acid or anhydride thereof is a member selected from the group consisting of maleic acid, maleic anhydride, fumaric acid, itaconic acid and citraconic acid.

3. The resin according to claim 1, wherein the $\alpha,\beta$-unsaturated dicarboxylic acid or anhydride thereof is a member selected from the group consisting of maleic acid and maleic anhydride.

4. The resin according to claim 1, wherein the adduct contains 3 to 50% by weight of the $\alpha,\beta$-unsaturated dicarboxylic acid or anhydride thereof.

5. The resin according to claim 1, wherein the liquid conjugated diolefinic polymer is a member selected from the group consisting of a liquid polybutadiene, a liquid polyisoprene, a liquid butadiene-isoprene copolymer, a liquid butadiene-styrene copolymer and a liquid isoprene-styrene copolymer.

6. A process for producing a resin for coatings, which comprises adding at least one $\alpha,\beta$-unsaturated dicarboxylic acid or anhydride thereof to at least one liquid conjugated diolefinic polymer having a number average molecular weight of 150 to 3,000, a viscosity of 2 to 5,000 cps at 30° C. and at least 50% of cis-1,4 structure, and reacting the resulting adduct with at least one primary amine having 1 to 27 carbon atoms, whereby the total amine value of the resulting modified polymer being made not more than 3.

7. The process according to claim 6, wherein the liquid conjugated diolefinic polymer is a member selected from the group consisting of a liquid polybutadiene, a liquid polyisoprene, a liquid butadiene-isoprene copolymer, a liquid butadiene-styrene copolymer and a liquid isoprene-styrene copolymer.

8. The process according to claim 6, wherein the $\alpha,\beta$-unsaturated dicarboxylic acid or anhydride thereof is a member selected from the group consisting of maleic acid, maleic anhydride, fumaric acid, itaconic acid and citraconic acid.

9. The process according to claim 6, wherein the α,β-unsaturated dicarboxylic acid or anhydride thereof is a member selected from the group consisting of maleic acid and maleic anhydride.

10. The process according to claim 6, wherein the primary amine having 1 to 27 carbon atoms is a member selected from the group consisting of methylamine, ethylamine, propylamine, butylamine, amylamine, hexylamine, oxtylamine, nonylamine, decylamine, undecylamine, dodecylamine, tridecylamine, tetradecylamine, pentadecylamine, hexadecylamine, heptadecylamine, octadecylamine, docosylamine, isopropylamine, isobutylamine, sec-butylamine, tert-butylamine, 2-aminopentane, 3-aminopentane, 1-amino-2-methylbutane, 2-amino-2-methylbutane, 3-amino-2-methylbutane, 4-amino-2-methylbutane, 1-amino-2,2-dimethylpropane, 5-amino-2-methylpentane and aniline, and a mixture of two or more kinds thereof.

11. A printing ink comprising 3 to 50% by weight of the resin set forth in claim 1, and the remaining amount being a conventional printing ink component selected from at least one member of the group consisting of pigments, solvents, resins, driers, and ultraviolet absorbents.

12. A paint composition comprising 5 to 80% by weight of the resin set forth in claim 1, and the remaining amount being a conventional paint component selected from at least one member of the group consisting of pigments, solvents, resins, and metallic driers.

* * * * *